(12) United States Patent
Miyamoto

(10) Patent No.: US 7,788,507 B2
(45) Date of Patent: Aug. 31, 2010

(54) CONTROL APPARATUS, ELECTRONIC DEVICE AND SIGNAL PROCESSING APPARATUS

(75) Inventor: Kazuya Miyamoto, Tokorozawa (JP)

(73) Assignee: Pioneer Corporation, Tokyo-to (JP)

( * ) Notice: Subject to any disclaimer, the term of this patent is extended or adjusted under 35 U.S.C. 154(b) by 1538 days.

(21) Appl. No.: 11/094,803

(22) Filed: Mar. 29, 2005

(65) Prior Publication Data

US 2005/0218840 A1    Oct. 6, 2005

(30) Foreign Application Priority Data

Mar. 30, 2004    (JP)    ............................. P2004-098541

(51) Int. Cl.
*H03L 7/06* (2006.01)
(52) U.S. Cl. .................. 713/300; 713/310; 713/320; 713/321; 713/322; 713/323; 713/324; 713/330; 713/340; 331/18; 327/156; 327/157; 327/158; 327/159
(58) Field of Classification Search .................. 713/300, 713/310, 320–324, 330, 340; 331/18; 327/156–159
See application file for complete search history.

(56) References Cited

U.S. PATENT DOCUMENTS

| | | | | |
|---|---|---|---|---|
| 5,155,840 A | * | 10/1992 | Niijima | ........................ 713/400 |
| 5,696,950 A | * | 12/1997 | Ichinose et al. | .............. 713/501 |
| 6,504,442 B2 | * | 1/2003 | Jordan et al. | ................. 331/173 |
| 7,047,353 B2 | * | 5/2006 | Tsuda et al. | ................. 711/105 |
| 2002/0145474 A1 | * | 10/2002 | Jordan et al. | .................. 331/14 |
| 2003/0093702 A1 | * | 5/2003 | Luo et al. | .................... 713/320 |
| 2004/0130387 A1 | * | 7/2004 | Marshall | ..................... 327/544 |
| 2005/0212932 A1 | * | 9/2005 | Steimle et al. | .............. 348/246 |

FOREIGN PATENT DOCUMENTS

| | | |
|---|---|---|
| JP | H07-200093 | 8/1995 |
| JP | 09-191569 | 7/1997 |
| JP | H10-164292 | 6/1998 |

* cited by examiner

*Primary Examiner*—Abdelmoniem Elamin
(74) *Attorney, Agent, or Firm*—Ladas & Parry, LLP

(57) ABSTRACT

A signal processing apparatus of an electronic device not only cuts off supply of power to a hardware unit from a power supply unit when a control signal associated with a power OFF command is supplied from an instruction input unit, but also turns OFF a switching circuit of an oscillation circuit unit, thereby cutting off supply of power to the oscillation circuit unit. The switching circuit is configured to be turned ON according to input of a signal from an interrupt port unit, and resumes supply of the power to the oscillation circuit unit upon supply of a control signal from the instruction input unit. When supply of a clock signal to a CPU circuit unit from the oscillation circuit unit is resumed, the CPU circuit unit resumes supply of power to the hardware unit from the power supply unit after operation of the CPU circuit unit is stabilized.

6 Claims, 7 Drawing Sheets

CONTROL APPARATUS, ELECTRONIC DEVICE AND SIGNAL PROCESSING APPARATUS

BACKGROUND OF THE INVENTION

1. Field of the Invention

This invention relates to an electronic device, and a control apparatus and a signal processing apparatus to be incorporated in said electronic device.

2. Description of the Related Art

Conventionally in an electronic device such as a DVD recorder, even if a user turns OFF the power (hereinafter referred to as "OFF status") by manipulating POWER key provided on the operation panel, during the power turned ON (hereinafter referred to as "ON status"), the power of the device is not cutoff completely, for instance, to detect the power ON command, and it is thus kept in a so-called suspended state. In such suspended state, power is supplied to a microcomputer (a control apparatus) that is usually incorporated in an electronic device, wherein a CPU operation clock signal is oscillated from an oscillation circuit included in the microcomputer and thus the device is in a state in which power is being consumed. Such power consumption tends to increase due to growing volume of information to be processed by microcomputers as the electronic devices become sophisticated. Hence, it has become an issue how to reduce said power consumption. Thus, in order to reduce power consumption in a suspended state, the invention shown in Japanese Patent Application Laid-Open No. 9-191569, for instance, has been proposed. In the invention of the above Patent Document, there is proposed such a configuration that a plurality of modes are provided as operating modes of a microcomputer, and in a suspended mode, frequency of a clock signal to be oscillated from an oscillation circuit comprised in the microcomputer is lowered, thereby reducing consumed power.

Now, in the invention according to the Patent Document described above, since a device has adopted such a configuration that the power ON command is detected by the clock signal of low frequency, oscillation of the operating clock cannot be stopped even in suspended state, and detection of the power ON command will become impossible if oscillation is stopped. Thus, even in the above invention, predetermined operating power was needed to detect the command.

SUMMARY OF THE INVENTION

This invention was made in light of the circumstances described above, and it is an object of the invention to provide a control apparatus, an electronic device and a signal processing apparatus that can reliably detect an entered command and switch the electronic device to ON status even in OFF status, while reducing power consumption when the power of the electronic device is turned OFF, as an example of problems to be resolved.

The invention according to claim 1 relates to a control apparatus, comprising:
an oscillating device which oscillates a clock signal of predetermined frequency by supplied power;
an input device which has at least a port into which a specific signal is supplied;
a switching device that switches ON and OFF supply of the power to said oscillating device; and
a control device which at least controls ON and OFF power supply of an electronic device based on said clock signal oscillated by said oscillating device when said switching device is in ON status;
wherein said switching device switches ON supply of the power to said oscillating device, if said specific signal is supplied into said port when supply of the power to said oscillating device is in OFF status.

The invention according to claim 5 relates to an electronic device, comprising:
hardware for implementing various functions; and
a control apparatus that at least controls supply of power to said hardware,
wherein said control apparatus comprises:
an oscillating device which oscillates a clock signal of predetermined frequency by supplied power;
an input device which at least has a port into which a specific signal is supplied;
a switching device which switches ON and OFF supply of the power to said oscillating device; and
a control device which at least controls ON and OFF of the power supplied to said hardware based on said clock signal oscillated by said oscillating device when said switching device is in ON status;
wherein said switching device turns ON supply of the power to said oscillating device, if said specific signal is supplied into said port when supply of the power to said oscillating device is in OFF status.

The invention according to claim 6 relates to a signal processing apparatus that processes various signals, comprising:
an oscillating device which oscillates a clock signal of predetermined frequency by supplied power;
an input device which at least has a port into which a specific signal is supplied;
a switching device which switches ON and OFF supply of the power to said oscillating device; and
a signal processing device which processes signals supplied into said input device, based on said clock signal oscillated by said oscillating device when said switching device is in ON status;
wherein said switching device turns ON supply of the power to said oscillating device if said specific signal is supplied to said port when supply of the power to said oscillating device is in OFF status.

DESCRIPTION OF THE PREFERRED EMBODIMENT

In the following, embodiments of this invention will be described with reference to the drawings. It should be noted that said embodiments do not limit the scope of this invention and can be arbitrarily modified within the scope of technological thought of this invention.

[1] Embodiment

[1.1] Configuration of Embodiment

Figure 1:
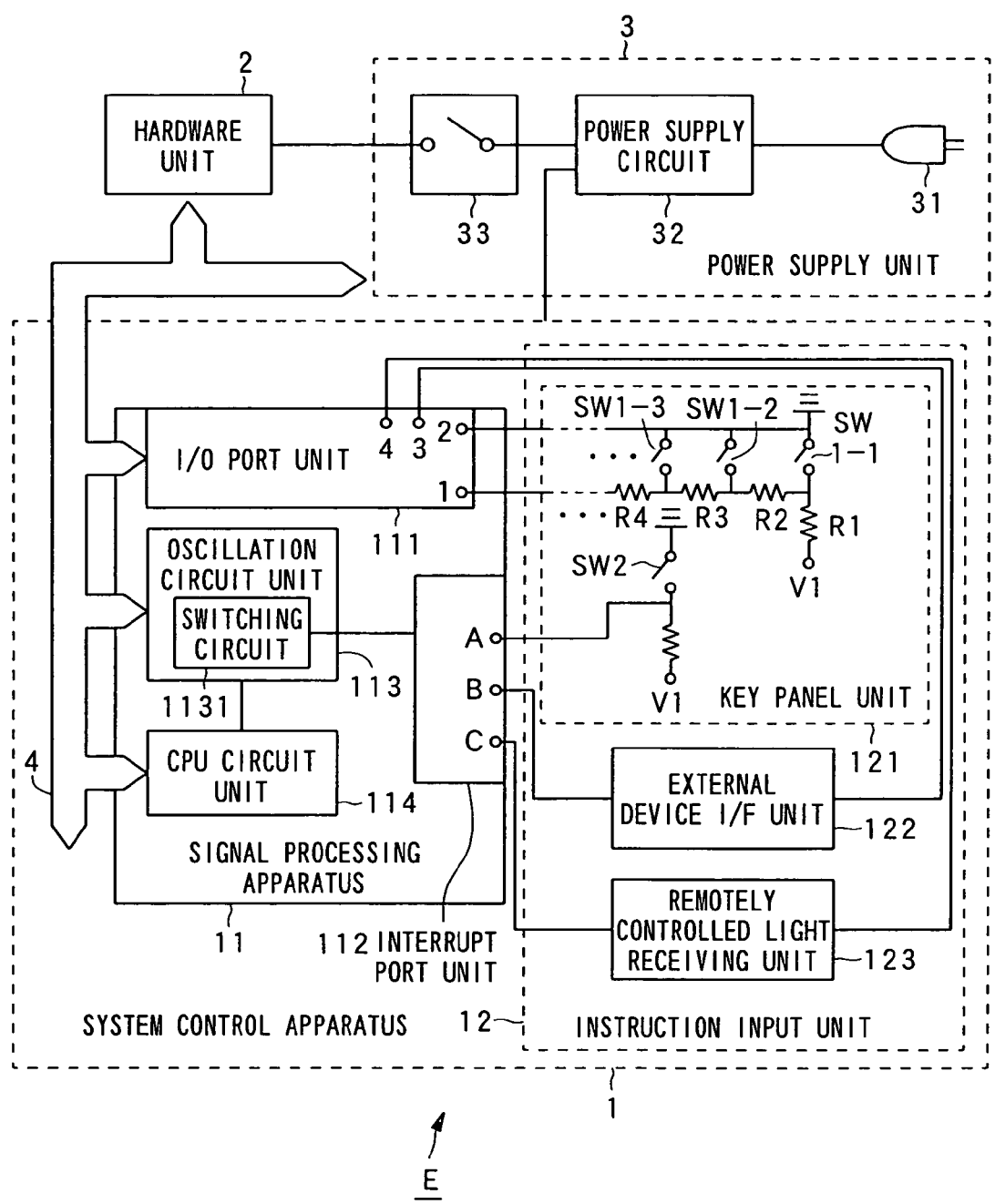
FIG. 1 is a block diagram showing configuration of an electronic device E in an embodiment.

With reference to FIG. 1 that is a block diagram showing configuration of said electronic device E according to this embodiment, configuration of the electronic device E that has incorporated a signal processing apparatus of the present invention is described. As shown in said figure, the electronic device E according to this embodiment has a system control apparatus 1, hardware unit 2, and a power supply unit 3. In addition, a "power supply control apparatus" in claims of the present application corresponds to the "system control apparatus 1" and "hardware" corresponds to "hardware unit 2".

This electronic device E attempts to reduce consumption of power generated in the system control apparatus 1, when the electronic device E is in OFF status, i.e., when the power supplied to the hardware unit 2 from the power supply unit 3 is cut off. In the following, respective components of the electronic device E according to this embodiment will be concretely described.

The hardware unit 2 is a component comprised of hardware for implementing functions that the electronic device E inherently has, and executes various operations under the control of the system control apparatus 1 connected by way of a data bus 4. The hardware unit 2 is comprised of different types of hardware, and executes different operations, depending on a kind of the electronic device E. For instance, when the electronic device E is an AV (audio visual) amplifier, the hardware unit 2 consists of a DSP (Digital Signal Processor) or a DAC (Digital Analog Converter), and hardware such as a voice processing unit having a low frequency amplifier. It processes signals for entered audio data, amplifies it through D/A conversion, and then performs an operation of outputting it to a speaker.

Connected to the hardware unit 2 by way of a switch 33, the power supply unit 3 rectifies power supplied from a plug 31 by means of a power supply circuit 32, and supplies it to the hardware unit 2 after stabilizing it at predetermined voltage. The switch 33 is such configured that it is turned ON or OFF under the control of the system control apparatus 1, and the power supplied from the power supply circuit 32 by the function of said switch 33 is supplied to the hardware unit 2 or cut off. As a result, the electronic unit E is in ON status with the switch 33 turned ON, and switches to OFF status with the switch 33 turned OFF. In addition, the power supply circuit 32 of the power supply unit 3 is connected to the system control apparatus 1 not through the switch 33, and supplies power to the system control apparatus 1 at all times.

Then, the system control apparatus 1 has, for instance, a signal processing apparatus 11 constituted by a microcomputer, and a instruction input unit 12 that supplies a control signal associated with various commands to the signal processing apparatus 11, which further has an IN/OUT port unit ("IN/OUT" is hereinafter referred to as "I/O") 111, an interrupt port 112, an oscillation circuit unit 13, and a CPU circuit unit 114. For instance, an "oscillating device" in claims of the present application corresponds to an oscillation circuit unit 113, and an "input device" corresponds to an I/O port 111 and an interrupt port 112. In addition, for instance, a "control device" corresponds to a CPU circuit unit 114 and an "instruction device" corresponds to an instruction input unit 12.

The CPU circuit unit 114 executes a control program stored in a storage area (not shown) and controls respective components of the electronic device E.

The I/O port unit 111 is connected with the data bus 4 and used for input/output of various types of signals. For instance, among input ports provided in the I/O port unit 111, I/O ports 1 and 2 are connected to a key panel unit 121 of the instruction input unit 12, an I/O port 3 is connected to an external device interface ("interface" is hereinafter referred to as "I/F") unit 122, an I/O port 4 is connected to a remote controlled light receiving unit 123, and a control signal from the instruction input unit 12 is supplied to the signal processing apparatus 11 by way of these ports.

A function of said I/O port unit 111 allows the CPU circuit unit 114 of the embodiment to control portions of the electronic unit E. For instance, when a control signal associated with a power OFF command is entered from the instruction input unit 12, said control signal is supplied to the CPU circuit unit 114. Then, according to the control program, the CPU circuit unit 114 executes an operation associated with said control signal, and controls the power supply unit 3. Consequently, in the power supply unit 3, the switch 33 is changed to OFF, and thus cutting off the power supplied to the hardware unit 2.

The interrupt port unit 112 has a port A to which a key panel unit 121 is connected, a port B to which the external device I/F unit 122 is connected, and a port C to which the remotely controlled light receiving unit 123 is connected, and outputs control signals supplied to respective ports to the switching circuit 1131 of the oscillation circuit unit 113.

For example, utilizing natural frequency of a crystal oscillator, the oscillation circuit unit 113 generates a clock signal of predetermined frequency and supplies it to the CPU circuit unit 114. The CPU circuit unit 114 operates based on, as an operating clock, the clock signal to be supplied from the oscillation circuit unit 113, and executes operations in accordance with the control program.

In addition, in this embodiment, the switching circuit 1131 for switching power supply ON/OFF is provided in the oscillation circuit unit 113. When the switching circuit 1131 is in OFF status, the power supply to the oscillation circuit unit 113 is turned OFF, i.e., cut off, and thus supply of a clock signal from the oscillation circuit unit 113 to the CPU circuit unit 114 is cut off. As a result, theoretically, power consumption at the signal processing apparatus 11 is "0". In addition, for instance, a "switching device" in claims of the present application corresponds to this switching circuit 1131.

Now in this embodiment, when turning the electronic device E OFF, namely, when turning OFF the switch 33 of the power supply unit 3, the CPU circuit 114 exercises control to turn the switching circuit 1131 OFF. However, when the switching circuit 1131 is turned OFF, it becomes impossible for the CPU circuit unit 114 to detect a control signal associated with the power ON command to be supplied by the instruction input unit 12. In other words, in this condition, it is no longer possible to turn the power of the electronic device E ON.

Thus, in this embodiment, when a control signal associated with the power OFF command is entered, the CPU circuit unit 114 sets restart of the switching circuit 1131. The restart setting is for the switching circuit 1131 to be turned ON when a control signal is entered from the instruction input unit 12 to the interrupt port unit 112, and to resume supply of the power to the oscillation circuit.

As a result of said setting, if an interrupt occurs when a control signal is input from the instruction input unit 12 to the interrupt port unit 112, supply of a clock signal by the oscillation circuit unit 113 is resumed and the CPU circuit unit 114 is enabled to execute operations in accordance with the control program by using the clock signal whose supply has been resumed. In addition, it is up to a user with how to specifically configure the switching circuit 1131. For instance, FET may be used to perform switching.

Then, the key panel unit 121 has key panels for specifying various commands such as reproducion key, stop key, rewind key, etc. and can receive input operation by a user. The configuration is such that respective keys of the key panel are associated with switches SW1-k (k=1, . . . , n) provided to ladder resistance, and pressing of the key turns ON the associated switch SW1-k.

The ladder resistance is composed of serially connected resistances Rk (k=1, 2, . . . , n) from a terminal to which reference voltage V1 is applied to an I/O port 1 of the I/O port unit 111 of the signal processing apparatus 11, and connecting points of respective resistances Rk are connected with an I/O port 2 by way of the switch SW-k. Thus, a potential difference to be generated between the I/O ports 1 and 2 will vary depending on how the keys are pressed. The signal processing apparatus 11 receives, as a control signal, the potential difference to be generated between the I/O ports 1 and 2, and determines the user's input operation based on the control signal.

The key panel provided to the key panel unit 121 also includes Power key that is associated with not only the switch SW1-k mentioned above, but also a switch SW2. The switch SW2 has been provided to connect the reference voltage V1 to be applied to the port A of the interrupt port unit 112 of the signal processing apparatus 11 to the ground. Thus, when Power key provided to the key panel is pressed, the reference voltage V1 applied to the port A is connected to the ground and the control signal entered changes from level "H" to level "L".

The external device I/F unit 122 has a connector to connect with an external device, has a control signal transmitted from the external device through the connector converted into a format processable at the signal processing apparatus 11, and outputs it to an I/O port 3 of the I/O port unit 111 and to a port B of the interrupt port unit 112.

The remotely controlled light receiving unit 123 is, for example, composed of a light receiving element, and not only receives a control signal transmitted by infrared radiation from a remote control apparatus, but also has said received control signal converted into a format processable at the signal processing apparatus 11, and outputs it to the port B of the interrupt port unit 112 of the signal processing apparatus 11. At this time, the remotely controlled light receiving unit 123 also outputs said control signal to the I/O port 4 of the I/O port unit 111.

Now as described above, in the signal processing apparatus 11 according to this embodiment, when a control signal is entered to the interrupt port unit 112 with the restart setting specified and an interrupt occurs, supply of the operating clock by the oscillation circuit unit 113 is resumed, and the CPU circuit unit 114 shifts to the operating condition. As for an operation to be executed after activation of the CPU, however, different operations are requested, depending on to which port of the interrupt port unit 112 the interrupt has occurred.

Specifically, when the interrupt has occurred in the port A, i.e., when Power key of the key panel unit 121 has been pressed, it is necessary that input of said control signal, serving as a trigger, turn the switch 33 ON, thus shifting the electronic device E to ON status. In addition, when the interrupt has occurred in the port B, i.e., when a control signal has been entered from the external device I/F unit 122, it is necessary that input of a control signal, serving as a trigger, shifts the electronic device E to ON status, thereby enabling control from the external device.

In the meantime, when the interrupt has occurred in the port C, i.e., when a control signal has been entered from the remotely controlled light receiving unit 123, the user might feel uncomfortable if said input, serving as a trigger, uniformly shifted the electronic device E to ON status. To be specific, in this embodiment, when the remotely controlled light receiving unit 123 receives a control signal, said control signal is entered to the port C independently of content of the command corresponding to the control signal. Thus, for instance, even when the remotely controlled light receiving unit 123 receives any control signal other than that associated with the power ON command, the electronic device E might shift to ON status and any performance different from that intended by the user might be executed at the electronic device E.

Hence, it cannot be called a good idea to immediately shift the electronic device E to ON status upon entry of a control signal from the remotely controlled light receiving unit 123. Thus, in this embodiment, when supply of the operating clock has been resumed, the CPU circuit unit 114 discriminates into which port of the interrupt port unit 112 the control signal has been supplied. Then, it is up to the user to decide how the CPU circuit unit 114 will discriminate the port into which the control signal has been supplied. For instance, it would be possible to set in advance for every port A, B, C, a vector address to which a jump is made from an interrupt vector after oscillation of a clock signal starts, and to discriminate a port into which a control signal has been entered, based on the address to which a jump is made, after an interrupt to the interrupt port occurs. It would also be possible to set for each port, a flag bit showing whether or not a control signal has been entered, and to discriminate a port into which a control signal has been entered, based on status of said flag bit.

If as a result of said discrimination, it is discriminated that the control signal has been entered, and the interrupt has occurred in Port C, the CPU circuit unit 114 discriminates whether the control signal supplied into the I/O port 4 is associated with the power ON command, without switching the switch 33 of the power supply unit 3. Then, while the CPU circuit unit 114 exercises control to turn the switch 33 ON if said control signal is associated with the power ON command, it makes restart setting again to shift the switching circuit 1131 to OFF status if it is associated with any command other than the power ON command.

However, in order to execute said operation, there is a problem to be described below. In fact, as it takes time of about 10 mmsec (hereinafter the time is referred to as "wait time") for the oscillation circuit unit 113 to stabilize oscillation of a clock signal from start of power supply, the CPU circuit unit 114 maintains substantially inoperative condition during the wait time. Thus, even though a control signal is supplied to both the interrupt port unit 112 and I/O port unit 111 from the remotely controlled light receiving unit 123 only once, it will become impossible to exercise control as discussed above after operation of the CPU circuit unit 114 is resumed. In this embodiment, when receiving a control signal from the remote control apparatus, the remotely controlled light receiving unit 123 outputs identical control signals to the interrupt port unit 112 and the I/O port unit 111 twice. Thus, the outputting of control signals twice enables the CPU circuit 114 to start oscillation of the oscillation circuit depending on a first input signal, and to discriminate content of said control signal by using a second control signal.

Although timing at which the remotely controlled light receiving unit 123 outputs the second control signal is optional, it is, at least, necessary to output the second control signal after the wait time has elapsed. It is also optional how the remotely controlled light receiving unit 123 outputs identical control signals twice. For instance, it is possible to adopt any of the following methods:

(Method 1) When the remote control apparatus executes input operation, said remote control apparatus is set so as to transmit identical control signals twice, and the remotely controlled light receiving unit 123 directly outputs received control signals to the interrupt port 112 and the I/O port unit 111.

(Method 2) A delay circuit is incorporated in an output part to the I/O port unit 111 of the remotely controlled light receiving unit 123. Then, a control signal is supplied into the I/O port unit 111 with delay time of about 20 mmsec from entry of a control signal to the interrupt port unit 112. Thus, the control signals are output twice in a pseudo manner.

[1.2] Operation of Embodiment

Figure 2:
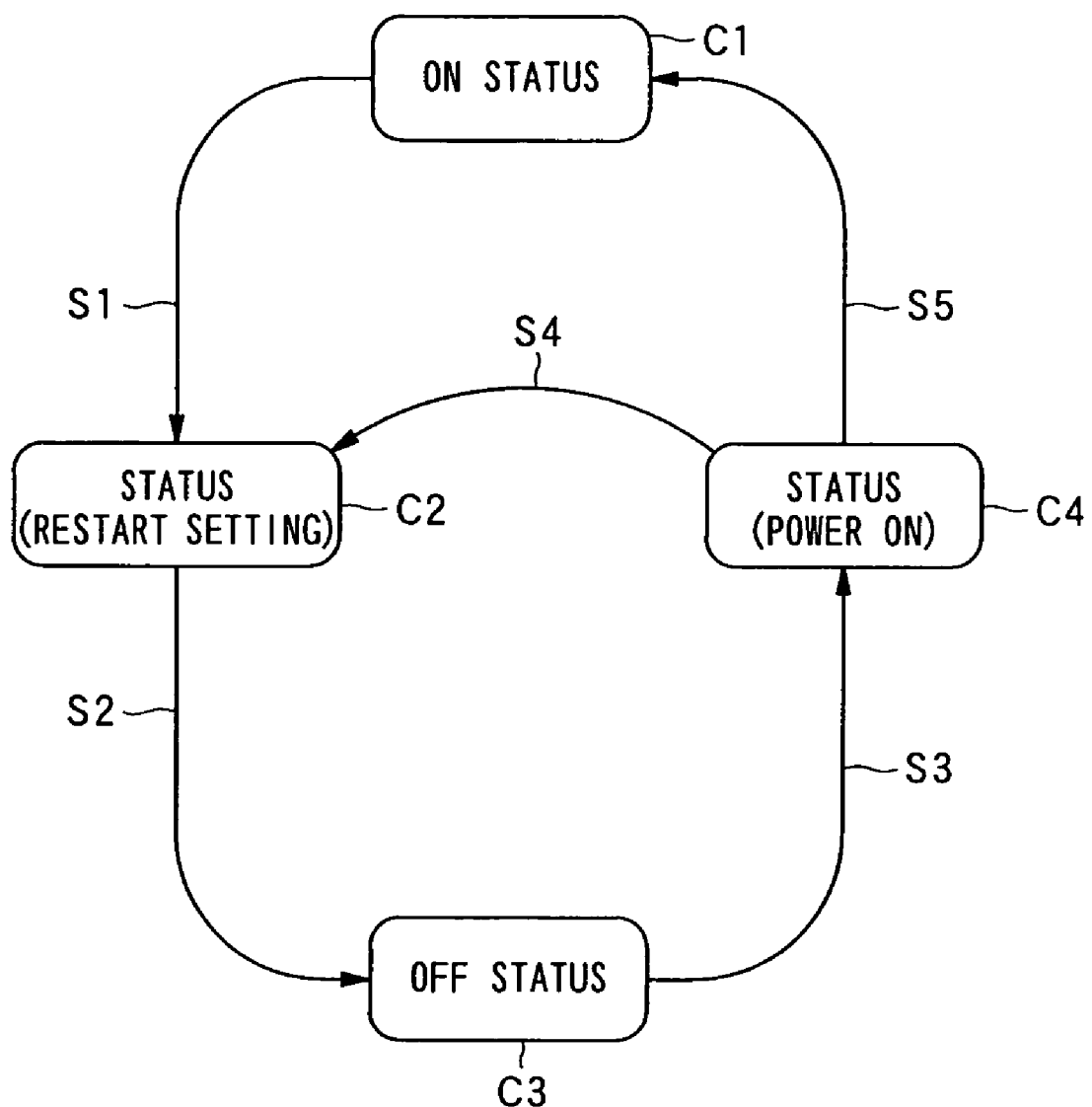
FIG. 2 is a diagram showing state transition of the electronic device E in the same embodiment.

Next, operation of the electronic device E according to this embodiment will be described with reference to FIG. 2. FIG. 2 shows transition of conditions of the electronic device E according to this embodiment. In the same figure, each status is shown by a circle, and a transition from one status to another is shown by an arrow.

First, when the electronic device E is in ON status C1, the power is supplied to the system control apparatus 1 and the hardware unit 2 from the power supply 3 because the switch 33 of the power supply unit 3 is kept ON. In addition, in ON status C1, since the switching circuit 1131 of the signal processing apparatus 11 is kept in ON status, the power is supplied to the oscillation circuit unit 113 wherein a clock signal is oscillated. Utilizing the clock signal, the CPU circuit unit 114 executes the control program, and exercises control associated with the control signals associated with various commands to be supplied from the instruction input unit 12.

For instance, when input operation is done to the key panel of the key panel unit 121, resistance of the ladder resistance changes, and the potential difference to be generated between the I/O ports 1 and 2 of the I/O port unit 111 varies. Based on said potential difference, the CPU circuit unit 114 discriminates a command entered by the user, and exercises control associated with the command to the hardware unit 2. In addition, for example, when the user manipulates the remote control apparatus (now shown), infrared radiation resulting from modulation of a control signal corresponding to said input operation is received at the remotely controlled light receiving unit 123. Consequently, the remotely controlled light receiving unit 123 supplies said control signal to the I/O port unit 111, and the CPU circuit unit 114 exercises control associated with said control signal to the hardware unit 2.

In the ON status C1, for instance, the user manipulates Power key on the key panel unit 121 or Power button of the remote control apparatus. Then, the instruction input unit 12 supplies a control signal associated with the power OFF command to the I/O port unit 111. Input of said control signal serving as a trigger, the electronic device E shifts from ON status C1 to status C2 in which restart setting is to be made (Step S1). In the status C2, the CPU circuit unit 114 turns OFF the switch 33 of the power supply unit 3, and thus the power supplied to the hardware unit 2 is cut off. In addition, then, the CPU circuit unit 114 makes restart setting of the switching circuit 1131, and switches the switching circuit 1131 to OFF. Consequently, supply of the clock signal by the oscillation circuit unit 113 is stopped, and the electronic device E shifts to OFF status C3 (Step S2).

Then, in the OFF status C3, when a control signal is supplied to any of the Ports A, B, C of the interrupt port unit 112 and an interrupt occurs, the electronic device E shifts to status C4 (Step S3). In the status C4, the switching circuit 1131 turns ON according to the control signal supplied to the interrupt port, and the power supply to the oscillation circuit unit 113 is resumed. Then, in the signal processing apparatus 11, although the CPU circuit unit 114 becomes substantially inoperative till the wait time elapses, it will become operative when supply of the clock signal is stabilized.

Figure 3:
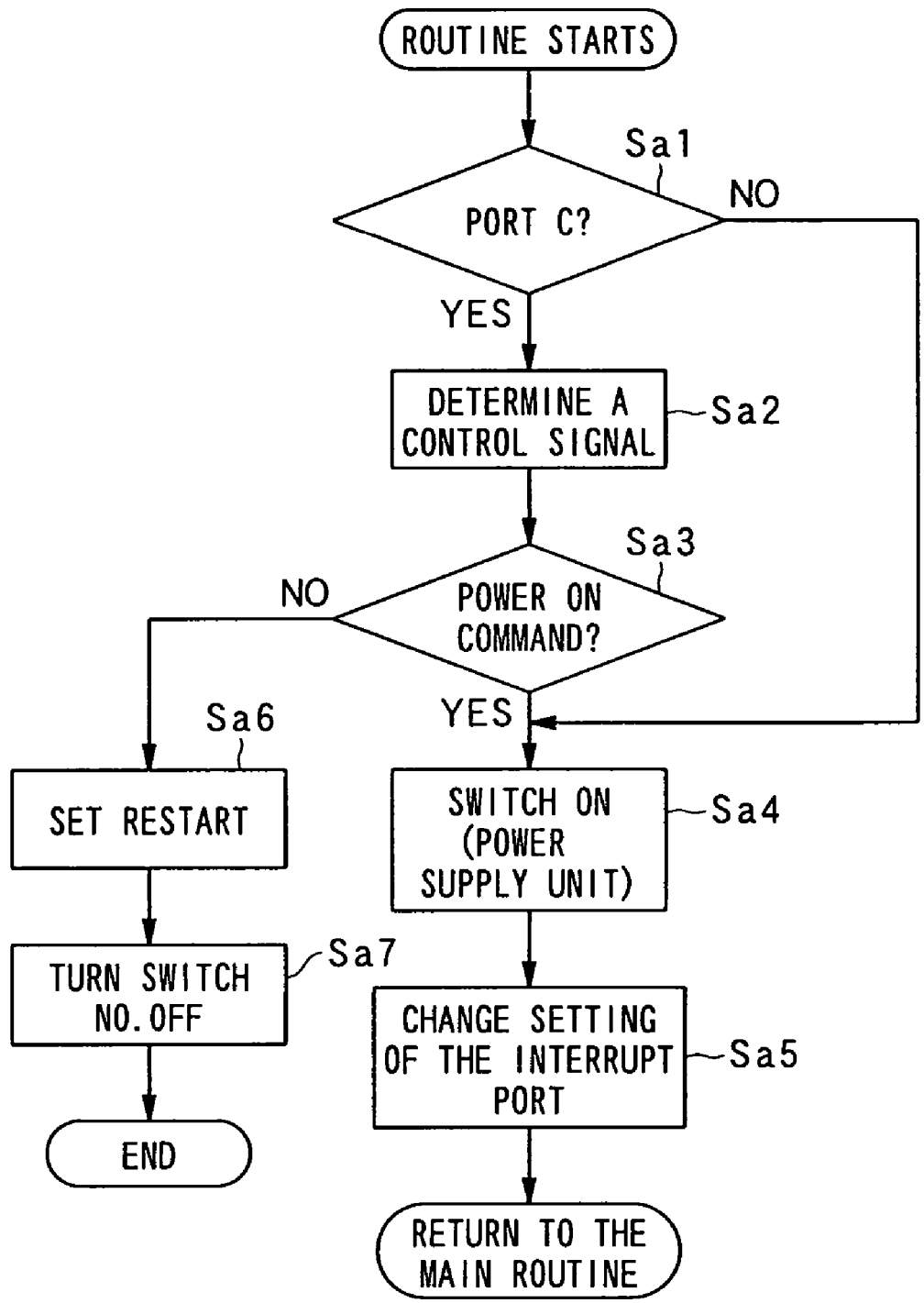
FIG. 3 is a flow chart showing the operation to be executed by the CPU circuit unit 114 in the same embodiment.

Thus, when the CPU circuit unit 114 becomes operational, the CPU circuit unit 114 executes the control program, and executes operations as shown in the flow chart of FIG. 3, as subroutines of said control program. In this operation, the CPU circuit unit 114 first determines whether the port into which the control signal has been supplied and where the interrupt has occurred is Port C or not, namely, whether the control signal has been output from the remotely controlled light receiving unit 123 or not (Step Sa1). Then, as discussed earlier, it would be optional how the CPU circuit unit 114 discriminates the port into which the control signal has been supplied.

In said determination, if it is determined "no", the CPU circuit unit 114 changes setting of the interrupt port unit 112 (Step Sa5) after exercising of control to the power supply unit 3 (Step Sa4), and return to a main routine. As a result, the switch 33 of the power supply unit 3 is controlled to ON by the CPU circuit unit 114, and the electronic device E will shift to the ON status C1 (Step S5). In addition, as a result of the change of setting at Step Sa5, the switching circuit 1131 will no longer be switched ON/OFF even when a control signal is supplied into the interrupt unit 112.

At the same time, if it is determined "yes" in Step Sa1, the CPU circuit unit 114 discriminates second and subsequent control signals supplied from the I/O port unit 111 (Step Sa2), and determines whether said control signal is a control signal associated with the power ON command (Step Sa3). Then, as a result, if it is determined "yes", the CPU circuit unit 114 changes setting of the interrupt port unit 112 (Step Sa5) after exercising of control to the power supply unit 3 (Step Sa4), and returns to the main routine. Consequently, the electronic device E shifts to the ON status C1 (Step S5).

On the one hand, if it is determined "no" in Step Sa3, the CPU circuit unit 114 makes restart setting (Step Sa6), switches the switching circuit 1131 to OFF (Step Sa7), and terminates processing. As a result, the electronic device E shifts to OFF status C3 (Status S2) after shifting to the status C2 (Step S4).

Thus, in this embodiment, the system control apparatus 1 is a control apparatus 1 that at least controls supply of the power to the electronic device E, and comprises the oscillation circuit unit 113 that oscillates a clock signal of predetermined frequency by means of the supplied power, the I/O port unit 111 and the interrupt port unit 112 that at least have the interrupt port unit into which a control signal is supplied, the switching circuit 1131 that switches ON/OFF the power supply to the oscillation circuit unit 113, and the CPU circuit unit 114 that utilizes the clock signal oscillated from the oscillation circuit unit 113 with the switching circuit 1131 turned ON and at least controls ON/OFF of the power of the electronic device E, wherein the switching circuit 1131 is configured such that it switches power supply to the oscillation circuit unit 113 to ON when a control signal is supplied into the interrupt port with the power supply to the oscillation circuit unit 113 turned OFF.

With this configuration, when the switching circuit 1131 is in OFF status, namely, when the power is not being supplied to the oscillation circuit unit 113, the switching circuit turns ON if a control signal is supplied into the interrupt port and the interrupt occurs, and the power supply to the oscillation circuit unit 113 is resumed. Since this allows a clock signal to be supplied to the CPU circuit unit 114 from the oscillation circuit unit 113, the CPU circuit unit 114 shifts to the operational status, thus turning the power of the electronic device E ON (ON status). Thus, it becomes possible to detect an entered command and change the electronic device E to ON status even when the power supply to the oscillation circuit unit 113 is cut off, thereby enabling power consumption to be reduced when the electronic device E is in OFF status.

In addition, in this embodiment, the system control apparatus 1 further has the instruction input unit 12 that, after receiving the user's input operation and entering a control signal corresponding to said operation to the interrupt port 112, supplies into the I/O port unit 111 a second control signal which is identical to said control signal, wherein the CPU circuit unit 114 discriminates the operation associated with the second control signal supplied from the instruction input unit 12, based on a clock signal oscillated from the oscillation circuit unit 113 as a result of switching to ON of the switching circuit 1131. Then, the CPU circuit unit 114 adopts such configuration that, as a result of the discrimination mentioned above, it determines whether the discriminated operation matches predetermined operation, and turns the power of the electronic device E ON when it determines that said operation matches the predetermined operation.

With this configuration, the first control signal supplied from the instruction input unit 12 to the interrupt port unit 112 allows oscillation of the oscillation circuit unit 113 to be resumed, and the clock signal generated as a result of this is supplied to the CPU circuit unit 114. At the same time, the CPU circuit unit 114 discriminates content of operation of the user based on the second control signal while utilizing the supplied clock signal, and turns the power of the electronic device E ON if the discriminated operation is associated with the power ON command, for example. This makes it possible to reliably detect the command associated with said control signal and execute control in accordance with the user's intention, even when the specific content of the command associated with said control signal needs to be detected, as in the case where the control signal is supplied into the interrupt port unit 112 from the remotely controlled light receiving unit 123.

[1.3] Examples of Variants (1) Example of Variant 1

Figure 4:
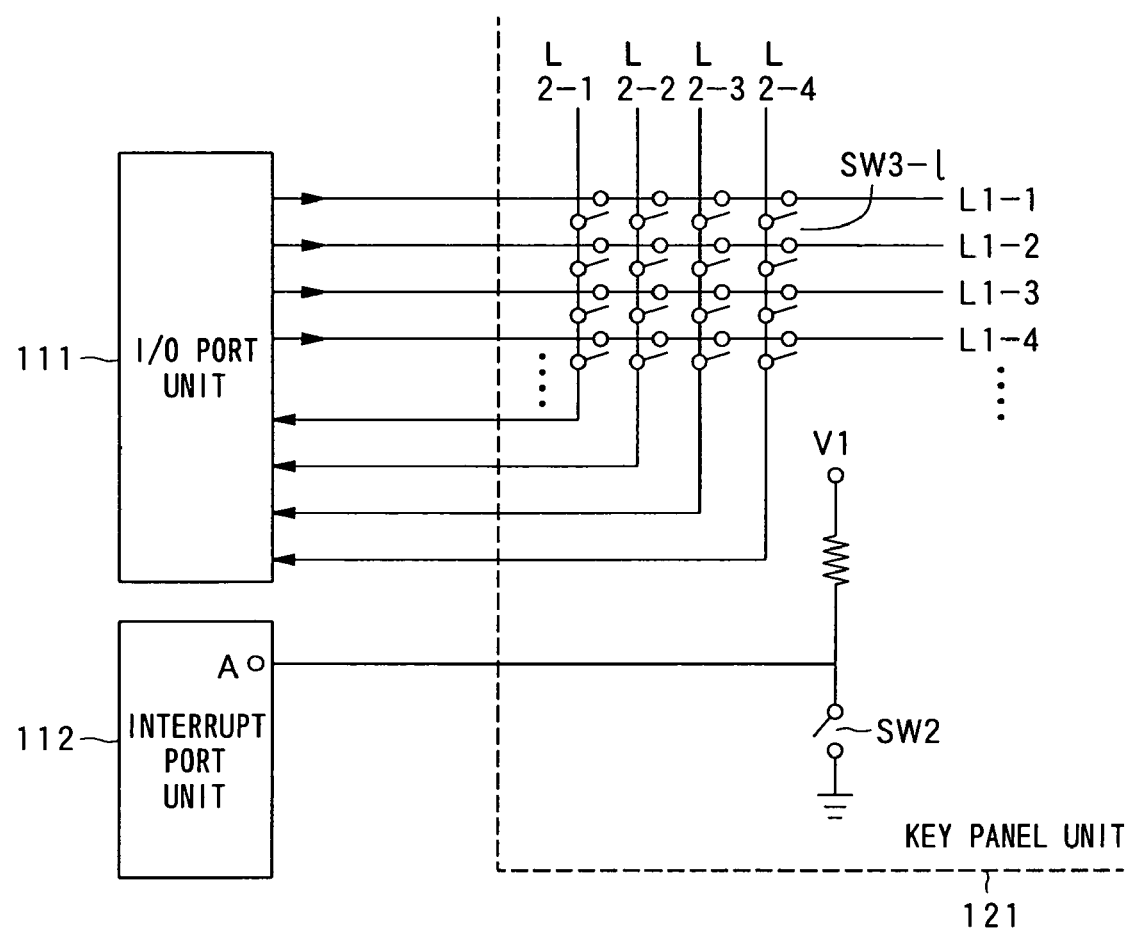
FIG. 4 is a block diagram showing configuration of the key panel unit 121 in the example of variant 1.

In the embodiment described above, the key panel unit 121 of the instruction entry unit 12 was comprised of the ladder resistance. However, the key panel unit 121 may be comprised of a key matrix, as shown in FIG. 4, where line L1-s (s=1, 2, ..., r) of the key matrix is connected to the output port of the I/O port unit 111, and line L2-t (t=1, 2, ..., p) is connected to the input port of the I/O port unit 111.

In addition, between the line L1-s and L2-t, switch SW3-1 (1=1, 2, ..., m) for switching connection of both lines is provided, and respective keys of the key panel unit 121 are associated with the switch SW3-1. Additionally, the switch SW3-1 has such configuration that rectifying elements composed of diodes, for instance, are connected thereto so that the current flows only in the direction from line L1-s to line L2-t. Consequently, when a key is pressed on the key panel unit 121, both lines L1-s and L2-t are connected, and based on the conduction state of the respective lines L1-s and L2-t, the CPU circuit unit 114 discriminates what key is pressed.

In this example of variant, Power key of the key panel unit is associated with the switch SW2 and associated with the above-mentioned switch SW3-1, and when Power key is pressed, voltage applied to Port A of the interrupt port unit 112 changes from level "H" to level "L". Other components are similar to those in the above embodiment.

(2) Example of Variant 2

In the embodiment described above, the remotely controlled light receiving unit 123 is configured such that it is connected to both the I/O port 4 of the I/O port unit 111 and Port C of the interrupt port unit 112. It is also possible, however, to adopt the configuration in which the remotely controlled light receiving unit 123 is connected only to Port C. In such a case, it is also possible to adopt the configuration in which when restart is set, the CPU circuit unit 114 sets Port C as an interrupt port, and generation of an interrupt in Port C (input of a control signal) resumes operation of the CPU circuit unit 114, and then Port C will be reset to the I/O port. Furthermore, similar operation may be possible by making Port C of the interrupt port unit 112 have the capability as an I/O port. In addition, connection between the external device I/F unit 122 and the signal processing apparatus 11 is similar to the case of the remotely controlled light receiving unit 123 described above.

(3) Example of Variant 3

Figure 5:
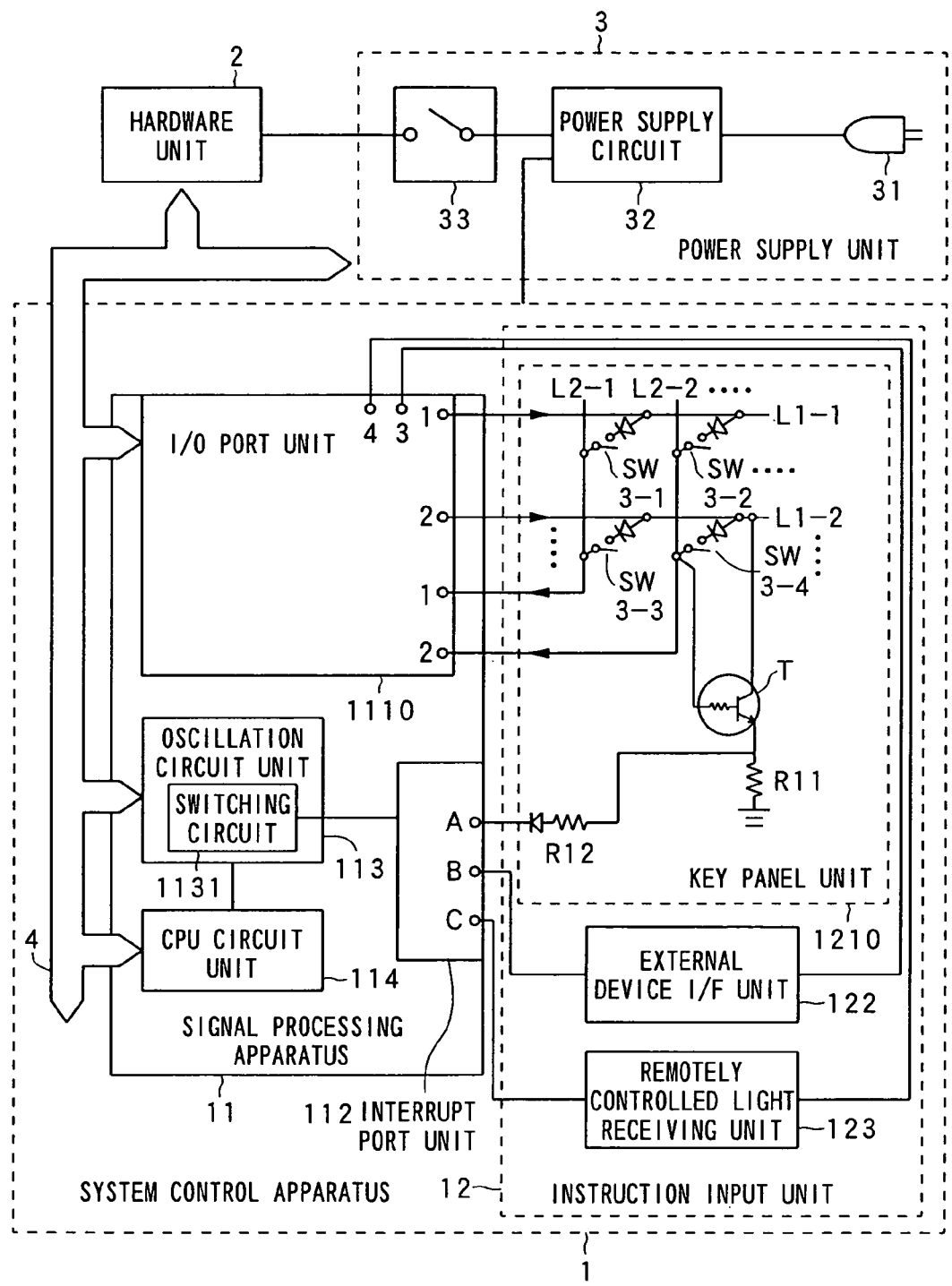
FIG. 5 is a block diagram showing configuration of the electronic device E1 in the example of variant 3.

FIG. 5 shows configuration of the electronic device E1 according to this example of variant. In the same figure, similar reference symbols are assigned to the components that are similar to those in FIG. 1 above.

Now, the electronic device E1 according to the example of variant not only causes the electronic device E1 transit to ON status for entry of any predetermined commands other than the power ON command, but also exercises control associated with said commands. For instance, if the electronic device E1 is a CD (Compact Disc) player, even in the case where input operation is done to the key panel unit 1210 or Reproduction key of the remote control apparatus, the electronic device E1 also shifts to ON status, thus exercising control to reproduction of a CD medium.

In the example of variant, in order to implement said function, the key panel unit 1210 is composed of a key matrix, as in the example of variant 1 described above, wherein each switch SW3-1 of the key matrix is associated with each key of the key panel constituting the key panel unit 1210. In addition, an NPN transistor T is provided in the key panel unit 1210, wherein not only a collector of the transistor T is connected to the line L1-s associated with the predetermined switch SW3-1, but also the base is connected to the line L2-t associated with the switch SW3-1.

In the meantime, an emitter of this transistor T is connected with not only the ground by way of resistance R11, but also Port A of the interrupt port unit 112 by way of a rectifying element such as a diode and resistance R12. Said configuration allows the switch SW3-1 to which transistor T is connected to be turned on, and thus making the transistor T be turned on, and supplying a control signal into Port A of the interrupt port unit 112. In addition, it is optional to decide to which switch SW3-1 the transistor T is connected. For instance, if the base of the transistor T is caused to be connected with SW3-1 associated with reproduction key, pressing of Reproduction key supplies a control signal into Port A. More than one transistors T being provided, wherein to the base of each transistor T and the collector are connected lines L1-s and L2-t associated with more than one switches SW3-1, it will also be possible to supply a control signal into Port A, depending on ON and OFF of the plurality of switches SW3-1. Thus, in this embodiment, this configuration allows a control signal to be supplied into the interrupt port unit 112 even when any key other than Power key is pressed.

Figure 6:
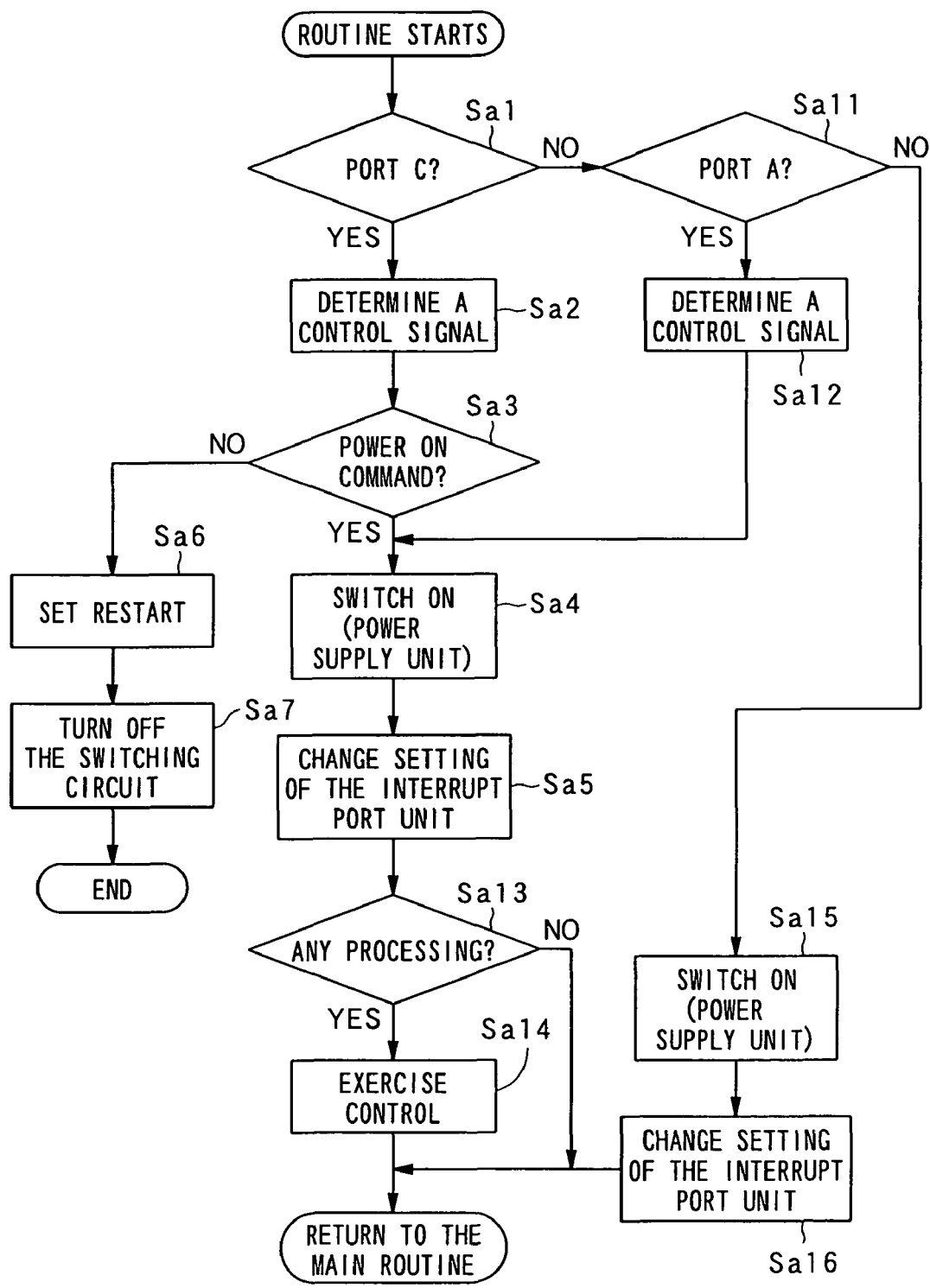
FIG. 6 is a flow chart showing the operation to be executed by the CPU circuit unit 114 in the same example of variant.

In addition, in the example of variant, by executing a routine as shown in FIG. 6 instead of the routine in FIG. 3, the CPU circuit unit 114 not only has the electronic device E1 transit to ON status C1, but also exercises control associated with said command, even if a predetermined command other than a command of power supply ON is supplied. In this operation, the CPU circuit unit 114 first checks whether or not the port into which the control signal has been supplied and at which the interrupt has occurred is Port C, namely, whether it is the remotely controlled light receiving unit 123 that outputs the control signal (Step Sa1).

If it is determined "yes" in this determination, it becomes necessary to decide what operation is executed according to the supplied control signal. Then, if it is determined "yes", the CPU circuit unit 114 executes the operation similar to Step Sa2 of FIG. 3, and discriminates said supplied control signal. Then, depending on result of the discrimination, the CPU circuit unit 114 executes the process similar to Step Sa3, and executes those similar to Steps Sa6 and Sa7 if it is determined "no". Consequently, the electronic device E1 transits to OFF status C3 (Step S2) after transiting to the status C2 (Step S4).

In the meantime, if it is determined "yes" in Step Sa3, the CPU circuit unit 114 determines whether the operation based on content of the control signal discriminated in Step Sa2 is necessary or not (Step Sa13) after executing the process similar to steps Sa4 and Sa5 of FIG. 3. For instance, in the electronic device E1, if it is set such that it transits to ON status C1 when a reproduction command is entered, the CPU circuit unit 114 determines whether or not the control signal determined in Step Sa2 is associated with the reproduction command, and, if it is so, it is determined "yes" in this Step Sa13. In addition, when the reproduction command causes the electronic device to transit to ON status C1, as shown in the example, it is necessary to associate the switch SW3-1 of the key panel unit 1210 with the reproduction key.

Next, while the CPU circuit unit 114 returns to the main routine (Step Sa14) after exercising control associated with said command if it is determined "yes" in this Step Sa13, it returns to the main routine without exercising control associated with said command if it is determined "no".

On the contrary, if it is determined "no" in the above step Sa1, the CPU circuit unit 114 determines whether the port into which the control signal has been supplied and at which the interrupt has occurred is Port A (Step Sa11). If it is determined "no" in said step Sa11, the CPU circuit unit 114 changes the setting of the interrupt port unit 112 (Step Sa16) after exercising control to the power supply 3 (Step Sa15), and returns to the main routine.

On the contrary, if it is determined "yes" in Step Sa11, it becomes necessary to decide what operation should be executed according to said supplied control signal. Then, if it is determined "yes", the CPU circuit unit 114 executes the operation for discriminating said supplied control signal (Step Sa12).

Next, after executing steps Sa4 and Sa5, the CPU circuit unit 114 determines whether or not the operation based on content of the control signal discriminated in Step S12 is needed (Step Sa13). While it returns to the main routine after exercising control associated with said command (Step Sa14) if it is determined "yes" in this step Sa13, it returns to the main routine without exercising control associated with said command if it is determined "no".

Thus, in the example of variant, when content of the operation associated with the supplied control signal corresponds to content of the operation other than the power ON, the CPU circuit unit 114 determines that it matches predetermined content. This enables the CPU circuit unit to exercise control associated with said command after causing the electronic device E1 to transit to ON status, even if any command other than the power ON command is supplied.

(4) Variant 4

The above embodiment is to reduce power consumption at the signal processing apparatus 11 to theoretical "0" by cutting off supply of a clock signal to the CPU circuit unit 114, when the electronic device E is in OFF status. On the contrary, this example of variant is to execute time management and timer control even if the electronic device E2 is in OFF status, so that the electronic device E2 such as a DVD recorder or a video tape recorder can program recording of video.

Figure 7:
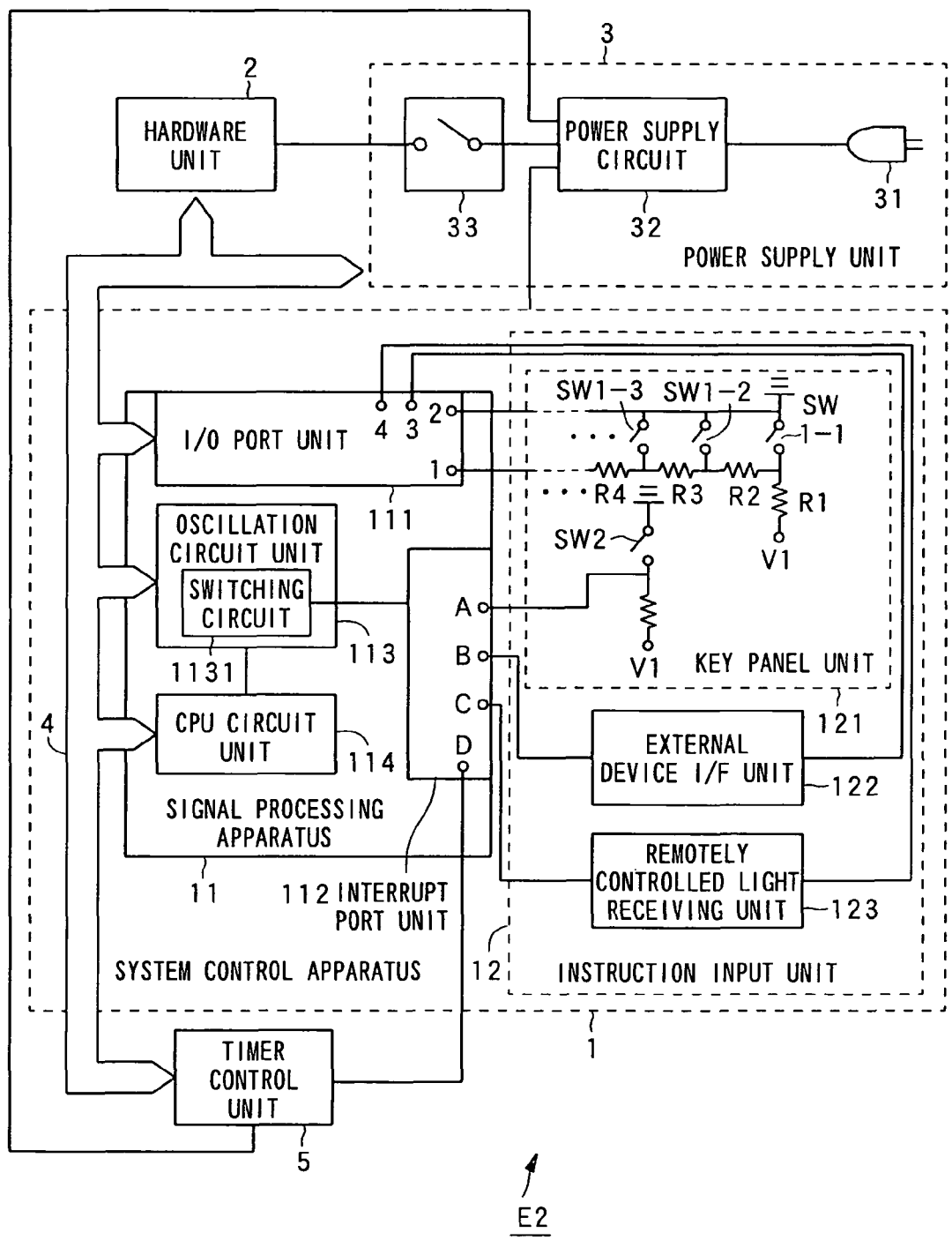
FIG. 7 is a block diagram showing configuration of the electronic device E2 in the example of variant 4.

FIG. 7 shows configuration of the electronic device E2 of said example of variant for implementing said function. In the same figure, similar reference symbols are assigned to the components similar to those in FIG. 1. Thus, unless otherwise indicated, respective elements assigned the reference symbols similar to those in FIG. 1 above shall have configuration and function similar to the above embodiment in FIG. 7.

As shown in the same figure, the electronic device E2 according to this example of variant is provided with a timer control unit 5 not only connected to Port D of the interrupt port 112, but also connected to the data bus 4, as well as it is provided with respective elements of FIG. 1. The timer control unit 5 has an oscillation circuit that continues to oscillate clock signals at all times when the electronic device E2 is in OFF status, and the clock signals generated from this oscillation circuit are used to implement the clock function. The oscillatory frequency of the clock signals used in the timer control unit 5 is, for instance, 32 kHz, that is lower frequency than the clock signals used by the CPU circuit unit 114.

In addition, the timer control unit 5 has a memory, and, for instance, receives programmed recording of video under the control of the signal processing apparatus 11, and records content of said programmed recording in this memory. And, when the electronic device E2 is in OFF status and supply of the clock signal to CPU circuit unit 114 is cut off, predetermined control signal based on the content of programmed recording is output to Port D of the interrupt port 112 of the signal processing apparatus 11.

On the one hand, unlike the above embodiment, the switching circuit 1131 in this example of variant is switched from OFF to ON, upon supply of the control signal to Interrupt Ports A, B, C and D of the interrupt port unit 112. Therefore, in this example of variant, upon supply of the control signal from the timer control unit 5, the switching circuit 1131 is switched to ON, and oscillation of the clock signal by the oscillating circuit unit 113 starts.

In addition, in the example of the variant, the timer control unit 5 also outputs a control signal to the I/O port unit 111 so as to cause the CPU circuit unit 114 to execute the operation associated with the above content of programmed recording, when the above control signal is supplied into the interrupt port unit 112.

However, even if an interrupt by the timer control unit 5 occurs when oscillation of the clock signal from the oscillation circuit unit 113 of the signal processing apparatus 11 is stopped, the wait time described above is also needed. Therefore the CPU circuit unit 114 cannot execute the operation according to said control signal, even though the control signal is supplied into the I/O port unit 111 when an interrupt signal to the interrupt port unit 112 is output.

Thus, in this example of variant, after predetermined time elapses following input of the control signal to the interrupt port unit 112, the timer control unit 5 supplies a control signal into the I/O port unit 111 again. This is similar to the above embodiment in which the remotely controlled light receiving unit 123 outputs a control signal twice. Then, it is optional how it outputs the control signal twice, as in the case of the remotely controlled light receiving unit 123 described above.

When the CPU circuit unit 114 is caused to actually execute the operation according to the content of programmed recording, a control signal is supplied into the interrupt port unit 112. Then, when the oscillation of the clock signals by the oscillation circuit unit 113 is stabilized, the CPU circuit unit 114 determines whether the port in which the interrupt has occurred is Port D or not. Then, if the CPU circuit unit 114 determines that said port is Port D, it discriminates the control signal supplied to the I/O port unit 111, and executes the operation according to the control signal after turning ON the switch 33 of the power supply unit 3.

Thus, the electronic device E2 according to this example of variant further has the timer control unit 5 that, after receiving input operation by the user and outputting a control signal to Port D of the interrupt port unit 112 at the time corresponding to said input operation, supplies to the I/O port unit 111 a second control signal that is the control signal identical to said control signal, wherein the CPU circuit unit 114 is configured to discriminate content of an operation associated with the second control signal based on the clock signal oscillated from the oscillation circuit unit 113 when the switching circuit 1131 is switched to ON, and to execute the operation associated with the control signal based on result of said discrimination.

This configuration switches the switching circuit 1131 to ON upon supply of the control signal by the timer control unit 5, and not only the clock signal is supplied to the CPU circuit unit 114, but also the operation associated with the second control signal is executed by the CPU circuit unit 114. Thus, this enables power consumption of the signal processing apparatus 11 to be reduced to theoretical "0" even in the electronic device E2 that needs the timer function such as programmed recording of video in a DVD recorder or a video tape recorder, thus making it possible to reduce power consumption when the electronic device E2 is in OFF status.

It should be understood that various alternatives to the embodiment of the invention described herein may be employed in practicing the invention. Thus, it is intended that the following claims define the scope of the invention and that methods and structures within the scope of these claims and their equivalents be covered thereby.

The entire disclosure of Japanese Patent Application No. 2004-98541 filed on Mar. 30, 2004 including the specification, claims, drawings and abstract is incorporated herein by reference in its entirety.

What is claimed is:

1. A control apparatus, comprising:
   an oscillating device which oscillates a clock signal of predetermined frequency by supplied power;
   an input device which has at least a port into which a specific signal is supplied;
   a switching device that switches ON and OFF supply of the power to said oscillating device; and
   a control device which at least controls ON and OFF power supply of an electronic device based on said clock signal oscillated by said oscillating device when said switching device is in ON status;
   wherein said switching device switches ON supply of the power to said oscillating device, if said specific signal is supplied into said port when supply of the power to said oscillating device is in OFF status;
   wherein the control apparatus further has an instruction device which, after receiving input operation by the user and supplying a first control signal associated with a content of said operation into said port, supplies to said input device a second control signal that is identical to said first control signal, wherein said control device has at least:
   a discriminating device which discriminates the content of operation associated with said second control signal based on said clock signal oscillated from said oscillating device when said switching device is switched to ON;
   a determining device which determines whether the content of operation discriminated by said discriminating device matches predetermined content or not; and
   a power supply control device which turns ON the power of said electronic device, when it is judged that said content of operation matches the predetermined content by said determining device.

2. A control apparatus according to claim 1, wherein said determining device, when the content of operation discriminated by said discriminating device is associated with the content of an operation other than power supply ON, determines that it matches said predetermined content.

3. A control apparatus, comprising:
   an oscillating device which oscillates a clock signal of predetermined frequency by supplied power;
   an input device which has at least a port into which a specific signal is supplied;
   a switching device that switches ON and OFF supply of the power to said oscillating device; and
   a control device which at least controls ON and OFF power supply of an electronic device based on said clock signal oscillated by said oscillating device when said switching device is in ON status;
   wherein said switching device switches ON supply of the power to said oscillating device, if said specific signal is supplied into said port when supply of the power to said oscillating device is in OFF status;
   wherein said control apparatus further has a timer control device which, after receiving an input operation by a user and outputting a first control signal to said port at time corresponding to said input operation, supplies into said input device a second control signal that is identical to said first control signal, wherein said control device has at least:
   a discriminating device which discriminates content of operation associated with said second control signal based on said clock signal oscillated from said oscillating device when said switching device is switched to ON; and an operation execution device which executes the operation associated with said first control signal based on result of the discrimination in said discriminating device.

4. An electronic device, comprising:
hardware for implementing various functions; and
a control apparatus that at least controls supply of power to said hardware, wherein said control apparatus comprises:
an oscillating device which oscillates a clock signal of predetermined frequency by supplied power;
an input device which at least has a port into which a specific signal is supplied;
a switching device which switches ON and OFF supply of the power to said oscillating device; and
a control device which at least controls ON and OFF of the power supplied to said hardware based on said clock signal oscillated by said oscillating device when said switching device is in ON status;
wherein said switching device turns ON supply of the power to said oscillating device, if said specific signal is supplied into said port when supply of the power to said oscillating device is in OFF status:
wherein the control apparatus further has an instruction device which, after receiving input operation by a user and supplying a first control signal associated with a content of said operation into said port, supplies to said input device a second control signal that is identical to said first control signal, wherein said control device has at least:
a discriminating device which discriminates the content of operation associated with said second control signal based on said clock signal oscillated from said oscillating device when said switching device is switched to ON
a determining device which determines whether the content of operation discriminated by said discriminating device matches predetermined content or not and
a power supply control device which turns ON the power of said electronic device, when it is judged that said content of operation matches the predetermined content by said determining device.

5. A signal processing apparatus that processes various signals, comprising:
an oscillating device which oscillates a clock signal of predetermined frequency by supplied power;
an input device which at least has a port into which a specific signal is supplied;
a switching device which switches ON and OFF supply of the power to said oscillating device; and
a signal processing device which processes signals supplied into said input device, based on said clock signal oscillated by said oscillating device when said switching device is in ON status;
wherein said switching device turns ON supply of the power to said oscillating device if said specific signal is supplied to said port when supply of the power to said oscillating device is in OFF status;
wherein the signal processing apparatus further has an instruction device which, after receiving input operation by a user and supplying a first control signal associated with a content of said operation into said port, supplies to said input device a second control signal that is identical to said first control signal, wherein said control device has at least:
a discriminating device which discriminates the content of operation associated with said second control signal based on said clock signal oscillated from said oscillating device when said switching device is switched to ON;
a determining device which determines whether the content of operation discriminated by said discriminating device matches predetermined content or not; and
a power supply control device which turns ON the power of said electronic device, when it is judged that said content of operation matches the predetermined content by said determining device.

6. The control apparatus of claim 1, wherein the port includes an interrupt port.

* * * * *